United States Patent
Takahashi et al.

[11] Patent Number: 5,885,920
[45] Date of Patent: *Mar. 23, 1999

[54] PROCESS FOR PRODUCING CATALYST CARRIER FOR OLEFIN POLYMERIZATION

[75] Inventors: Hirotoshi Takahashi; Yasushi Kuroda; Shinya Waki; Hisayoshi Yanagihara; Koichi Sekiya, all of Oita, Japan

[73] Assignee: Japan Polyolefins Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 561,942

[22] Filed: Nov. 22, 1995

[30] Foreign Application Priority Data

Nov. 25, 1994 [JP] Japan ................................. 6-291559

[51] Int. Cl.$^6$ ........................... B01J 27/132; B01J 31/00; B01J 27/138

[52] U.S. Cl. ........................... 502/228; 502/226; 502/103; 502/104; 502/111; 502/115; 502/116; 502/120; 502/122; 502/134

[58] Field of Search ..................... 502/226, 103, 502/134, 228, 104, 111, 115, 116, 120, 122

[56] References Cited

U.S. PATENT DOCUMENTS

| | | | |
|---|---|---|---|
| 3,953,414 | 4/1976 | Galli et al. | 526/348 |
| 4,315,874 | 2/1982 | Ushida et al. | 264/5 |
| 4,330,649 | 5/1982 | Kioka et al. | 526/125 |
| 4,431,568 | 2/1984 | Miya et al. | 502/122 |
| 4,469,648 | 9/1984 | Ferraris et al. | 264/9 |
| 4,499,194 | 2/1985 | Harada et al. | 502/8 |
| 4,724,225 | 2/1988 | Shimizu et al. | 502/107 |
| 5,110,443 | 5/1992 | Gregoli et al. | 204/157.42 |
| 5,124,297 | 6/1992 | Arzoumandis et al. | 502/120 |
| 5,501,778 | 3/1996 | Muller et al. | 204/157.42 |
| 5,556,820 | 9/1996 | Funabashi et al. | 502/111 |

FOREIGN PATENT DOCUMENTS

| | | | |
|---|---|---|---|
| 0 018 737 | 11/1980 | European Pat. Off. | C08F 10/00 |
| 0 601 524 | 6/1994 | European Pat. Off. | C08F 10/00 |
| 4965999 | 6/1974 | Japan . | |
| 56811 | 1/1981 | Japan | C08F 10/00 |

*Primary Examiner*—Mark L. Bell
*Assistant Examiner*—Patricia L. Hailey
*Attorney, Agent, or Firm*—Sughrue, Mion, Zinn, Macpeak & Seas, PLLC

[57] ABSTRACT

A process for producing a catalyst carrier for an olefin polymerization comprising:

(i) passing a mixture to be emulsified comprised of (A) a halogenated magnesium adduct and (B) a dispersion medium through an emulsifying apparatus comprised of (1) a conduit for passage of the mixture to be emulsified, (2) a vibrator element disposed in the conduit and vibrating in the axial direction of the conduit, and (3) a vibration device for giving the vibration movement to the vibrator element; and (ii) quenching the resultant mixture.

4 Claims, 2 Drawing Sheets

PROCESS FOR PRODUCING CATALYST CARRIER FOR OLEFIN POLYMERIZATION

BACKGROUND OF THE INVENTION

1. Field of the Invention

The present invention relates to the production of a catalyst suitable for producing an olefin polymer having a high bulk density, an excellent powder flowability, and a superior mechanical strength. More specifically, it relates to a process for producing a catalyst carrier for an olefin polymerization which is spherical in shape, has a narrow distribution of particle size, and enables the average particle size to be set to any desired size. Furthermore, the present invention relates to a process for producing a catalyst carrier for an olefin polymerization capable of producing the catalyst carrier for an olefin polymerization by an easy procedure in an industrially advantageous manner.

2. Description of the Related Art

Numerous proposals have been made regarding catalysts for an olefin polymerization composed of a transition metal compound catalyst component and an organometallic compound catalyst component.

When a transition metal compound carried on a spherical carrier having a narrow distribution of particle size is used as the transition metal compound catalyst component, it is known that a superior flowability and a high bulk density can be imparted to the resultant olefin polymer and, therefore, it is advantageous in the process.

Further, when the yield of the olefin polymer per transition metal compound catalytic component is sufficiently large, the resultant olefin polymer has little content of the transition metal and therefore, it becomes possible to eliminate the deash treatment step.

Accordingly, when the transition metal compound catalyst component having a spherical shape and having a narrow distribution of particle size has a suitable particle size and further when the yield of the olefin polymer per transition metal compound catalyst component is sufficiently large, the resultant olefin polymer has both a sufficient size and a shape exhibiting a superior flowability, and therefore, it becomes possible to eliminate the granulation step which have increased the production cost up to now.

In general, in order to eliminate the granulation step, it is desirable that the produced polymer has a spherical shape, a narrow distribution of the particle size and a suitable average particle size. When the average particle size is too small, the polymer will easily aggregate when the polymer includes a viscous component and, further, sometimes there will be problems in eliminating the granulation step. When the average particle size is too large, the polymer transporting line will easily become clogged. To obtain a polymer satisfying these conditions, the catalyst carrier for the olefin polymerization preferably has a spherical shape and a geometric standard deviation $\alpha$ of the particle size of not more than 1.5. Further, in accordance with the performance of the catalyst and the process of production of the polymer, the average particle size of the catalyst may be preferably set within the range from 1 to 200 $\mu$m. Such a catalyst component can be easily obtained from a spherical carrier having the shape and particle size equivalent or similar to those of the desired catalyst component.

Several methods for obtaining such a catalyst carrier for an olefin polymerization are known. For example, Japanese Unexamined Patent Publication (Kokai) No. 49-65999 proposes to use spherical particles obtained from a molten hydrated magnesium halide by a spray dry method as a catalyst carrier for an olefin polymerization. In this method, the distribution of the particle size of the resultant carrier is wide, and therefore, classification becomes required. Further, when performing classification, the yield drops. Also, the resultant polymer particles become porous, and therefore, there is the problem of an insufficient mechanical strength.

As another method for obtaining a catalyst carrier for an olefin polymerization, Japanese Unexamined Patent Publication (Kokai) No. 55-13512 proposes a method of rapidly cooling a suspension obtained by stirring a molten complex compound of magnesium halide and an alcohol in an organic liquid medium. In this method, a suspension in which the disperse phase particles are repeatedly separated and joined is withdrawn and cooled to a solid, and therefore, the distribution of the particle size becomes broader and the yield is decreased during the classification.

As another method for obtaining the catalyst carrier for an olefin polymerization, Japanese Unexamined Patent Publication (Kokai) No. 56-811 proposes a method for treating a molten complex compound of magnesium halide and an alcohol in an organic liquid medium by a Lewis acid. In this method, only a carrier having a small particle size can be obtained and it is not possible to obtain a polymer having a sufficiently large size. Furthermore, since it is necessary to use a large amount of a Lewis acid, there are the problems that the cost of production of the catalyst becomes higher and further the process for treating the waste liquor becomes complicated.

SUMMARY OF THE INVENTION

Accordingly, the objects of the present invention are to overcome the above-mentioned problems in a catalyst carrier for an olefin polymerization and the production process thereof and to provide a catalyst carrier for an olefin polymerization, which is spherical in shape, has a narrow distribution of particle size, and has a desired average particle size by an industrially easy and inexpensive means.

In accordance with the present invention, there is provided a process for producing a catalyst carrier for an olefin polymerization comprising:

(i) passing a mixture to be emulsified comprised of (A) a halogenated magnesium adduct and (B) a dispersion medium through an emulsifying apparatus comprised of (1) a conduit for passage of the mixture to be emulsified, (2) a vibrator element disposed in the conduit and vibrating in the axial direction of the conduit, and (3) a vibration device for giving the vibration movement to the vibrator element; and (ii) quenching the resultant mixture.

BRIEF DESCRIPTION OF THE DRAWINGS

The present invention will be better understood from the description set forth below with reference to the accompanying drawings wherein.

DESCRIPTION OF THE PREFERRED EMBODIMENTS

Figure 1:
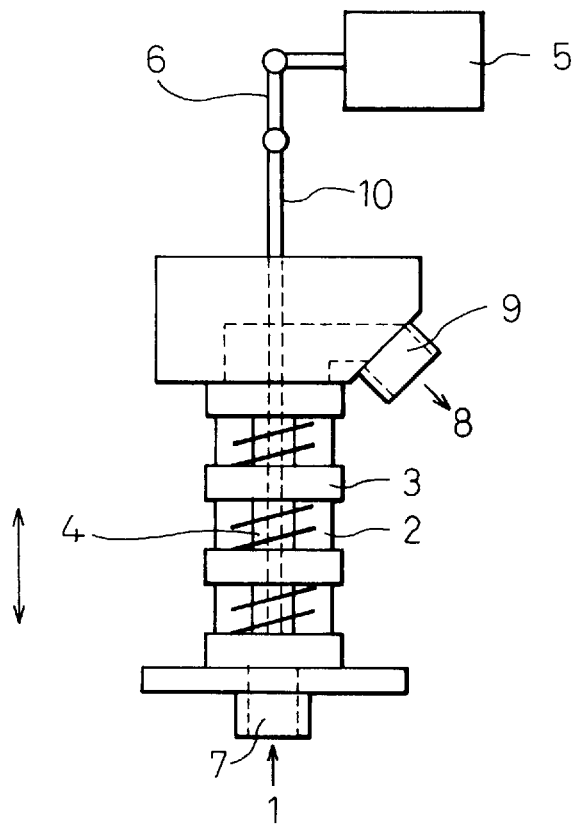
FIG. 1 is an example of an emulsifying apparatus according to the present invention.

The catalyst carrier for an olefin polymerization obtained according to the present invention has any particle size in the range of 1 to 200 μm and has a geometric standard deviation α of the particle size of 1.45 or less in any average particle size of the above range. Since the distribution of particle size is narrow in this way, the yield in the classification is excellent and the classification sometimes becomes unnecessary. When using a transition metal compound catalyst component prepared from such a catalyst carrier for an olefin polymerization, it is possible to produce an olefin polymer which is superior in flowability, has a high bulk density, and is excellent in mechanical strength. When the average particle size of the olefin polymer obtained using this transition metal compound catalyst component is suitable and the yield of the olefin polymer per transition metal compound catalyst component is sufficiently large, it also becomes possible to eliminate the granulation step.

Further, this newly developed process for production of a catalyst carrier for an olefin polymerization makes it easy to produce a large amount of carrier having a stable quality by a continuous emulsification process of the mixture to be emulsified.

The present invention will become clearer from the following description.

The halogenated magnesium adduct is composed of a magnesium halide and a compound compatible therewith.

The magnesium halide may be a complex compound including metals other than magnesium. Further, it may be a mixture of two or more magnesium halides and other compounds. For example, magnesium metal, organic magnesium compounds, magnesium alkoxides, mixtures of organic acid salts and inorganic acid salts of magnesium and magnesium halides, or mixtures of compounds formed by halogenating a part or all of these magnesium compounds and a magnesium halide may be exemplified. Among these, magnesium dihalide or mixtures thereof with other compounds are preferred. Examples of the magnesium dihalide are magnesium dichloride, magnesium dibromide, and magnesium diiodide.

The compounds capable of dissolving the magnesium halide include alcohols, phenols, carboxylic acids, amines, etc. Particularly preferable compounds are alcohols. Examples of the alcohols, are methanol, ethanol, n-propanol, and n-butanol. These compounds may be used alone or in any mixture thereof.

The halogenated magnesium adduct composed of the magnesium halide and the compound compatible therewith is emulsified in a dispersion medium. The dispersion medium must not exhibit an affinity high enough so that an emulsion making the adduct into disperse phase particles cannot be formed. Examples of the dispersion medium are decane, isoparaffin, kerosine, and hydrocarbons having a dynamic viscosity of 10 to 100 cSt at 40° C. Hydrocarbons are particularly preferred, but other solvents, for example, halogenated hydrocarbons, ethers, etc. may also be used. These dispersion media may be used alone or in any mixture thereof.

A dispersion stabilizer for causing the melt to stably emulsify in the dispersion medium may be added to the dispersion medium. Examples of the dispersion stabilizer are siloxanes, sorbitan esters, polyoxyalkylene glycols and derivatives, etc. Examples of the siloxanes are dimethyl polysiloxane, methylphenyl polysiloxane, methyl hydrogen polysiloxane, etc. Examples of the sorbitan ester are sorbitan distearate, sorbitan monostearate, and sorbitan monolaurate. These dispersion stabilizers may be used alone or in any mixture thereof.

The above-illustrated halogenated magnesium adduct and dispersion medium and, optionally, a dispersion stabilizer (i.e., these being referred to as the "mixture to be emulsified") are emulsified by passing them through an emulsifying apparatus.

The emulsifying apparatus is composed of:
(1) a conduit for passage of the mixture to be emulsified,
(2) a vibrator element disposed in the conduit and engaging the vibration movement in the axial direction of the conduit, and
(3) a vibration device for giving the vibration movement to the vibrator element.

The mixture to be emulsified is introduced into the conduit from one end (i.e., inlet) of the conduit, then passes through the conduit and is discharged from the other end (i.e., outlet). The method for introducing the mixture into the emulsifying apparatus is not limited. The method for introducing the components of the mixture in a premixed state and the method for separately preparing the components of the mixture and introducing the components at respectively desired speeds may be exemplified. Further, the method for using a gas etc. to apply pressure to the mixture and transport the mixture to the emulsifying apparatus under pressure and the method for using a transport device such as a pump to feed the mixture to the emulsifying apparatus may be exemplified.

The mixing ratio of the components in the mixture to be emulsified is not particularly limited. It is preferable that the composition enable stable emulsification of the mixture. When introducing the components of the mixture into the emulsifying apparatus in a premixed state, it is possible to control the mixing ratio of the components of the mixture by charging them in by the desired proportion. When separately preparing the components of the mixture and introducing them independently into the emulsifying apparatus, it is possible to control the mixing ratio of the components of the mixture by setting the speeds of introduction of the different components to give the desired mixing ratio.

The conduit need only have an inlet and outlet. Its shape is not particularly limited, but a shape having an axis of symmetry (or a shape close to the same) is preferable. A cylindrical shape is more preferable. It is possible to mount a device for controlling the flow of the mixture to be emulsified inside the conduit. While not particularly limited, a spiral blade is preferred.

It is possible to provide partition plates at suitable intervals inside the conduit so as to divide the inside of the conduit. This is effective in obtaining a catalyst carrier for an olefin polymerization having a narrow distribution of particle size since the reverse mixture of the mixture to be emulsified in the conduit and the rejoining due to the short cuts can be prevented to a great degree.

The vibrator element is disposed in the conduit and engages in vibration movement in the axial direction of the conduit. The "axis of the conduit" is the general term used for the axis of symmetry of the conduit or those similar thereto. The form of the vibrator element is not particularly limited. The method of placing an object serving as a vibrator element separate from the conduit inside the conduit and the method of using the inside surface of the conduit as a vibrator element may be mentioned. The vibrator element may have attached to it a device for controlling the flow of the mixture to be emulsified. While not particularly limited, a spiral blade is preferred. Further, it is preferable to place a plurality of vibrator element in a direction parallel to the flow direction of the mixture.

The vibration generating device is the source of the vibration movement and gives the vibration movement to the vibrator element. The vibration generating device is directly or indirectly connected to the vibrator element so that the vibration movement of the vibration generating device is conveyed to the vibrator element. The method of transmission of the vibration movement is not particularly limited. It is possible to convert the vibration movement generated by the vibration generating device into a type of vibration movement preferred for the vibrator element and then transmit this to the vibrator element.

The vibration movement in the emulsifying apparatus may be, for example, various types of motion such as elliptical or circular rotational motion or linear reciprocating motion. Linear reciprocating motion is preferred. This vibration movement is given in the axial direction of the conduit. The type of the vibration movement of the vibrator element and the type of the vibrator element are not particularly limited, but it is necessary that the vibration movement and the vibrator element be set so that the amount of the mixture to be emulsified per unit time be dependent on the speed of supplying the mixture to the emulsifying apparatus and that the shear force acting on the mixture be dependent on the speed of the vibration movement of the vibrator element (or be based on the same).

FIG. 1 shows an example of the emulsifying apparatus according to the present invention. It is arranged so that the mixture 1 to be emulsified flows in the conduit 2 partitioned by the partition plates 3. Inside the partitioned conduit 2 is disposed a vibrator element 4. The agitator is connected to a shaft of vibrator element 4. The circular rotational motion of a motor 5 serving as the vibration generating device is converted by a crankshaft 6 to linear reciprocating motion in the axial direction of the conduit 2. The vibration movement is transmitted to the vibrator element 4 through the agitator shaft 10. The mixture 1 to be emulsified enters from the inlet 7. The mixture 1 successively passes through the inside of the partitioned conduit 2. The mixture 1 is subjected to shearing while it flows through the inside of the conduit 2 and is thereby emulsified. The emulsified mixture 8 exits from the discharge end 9 (i.e., outlet).

The number of the vibration movement per unit time of the vibrator element of the emulsifying apparatus (i.e., the speed of vibration) is not particularly limited, but is preferably in the range of 100 to 10,000 times/minute. When the speed of vibration is too large, the proportion of the fine particles of the catalyst carrier for an olefin polymerization increases, while when the speed is too low, the proportion of giant particles increases, so there is a possibility of a detrimental effect on the distribution of particle size of the carrier.

The speed of introduction of the mixture to be emulsified into the emulsifying apparatus is expressed by the ratio Q/V between the volume Q of the mixture to be emulsified by the emulsifying apparatus per minute and the inside volume V of the conduit of the emulsifying apparatus. This Q/V is preferably within the range of 0.01 to 100 (liters/liters). When the speed of introduction is too low, the proportion of the fine particles of the catalyst carrier for an olefin polymerization increases, while when the speed of introduction is too large, the proportion of giant particles increases, and therefore, there is a possibility of a detrimental effect on the distribution of particle size of the carrier. The speed of introduction of the mixture into the emulsifying apparatus may be controlled by a flow control valve.

In the present invention, it is possible to control the average particle size of the catalyst carrier for an olefin polymerization by controlling the speed of introduction of the mixture to be emulsified into the emulsifying apparatus and the speed of vibration movement of vibrator element in the emulsifying apparatus. The average particle size is correlated with the emulsification efficiency α expressed by the following formula:

$$\alpha = Q/(N \cdot V)$$

Q: Volume of mixture to be emulsified passing through emulsifying apparatus per minute (liters)
N: Number of vibration movement per minute of vibrator element in emulsifying apparatus (times)
V: Inside volume of conduit in emulsifying apparatus (liters)

To obtain carrier particles of the desired size, it is preferable that the emulsification efficiency α be within the range of 0.0001 to 0.01 (/time).

In the emulsification method of the mixture using this emulsifying apparatus, there is almost no space inside the apparatus where the mixture will accumulate during the emulsification. Since a uniform emulsification can be obtained, this is effective for obtaining a narrow distribution of particle size of the carrier for an olefin polymerization. Further, a feature of the emulsifying apparatus is that the amount of the mixture to be emulsified per unit time is dependent on the speed of supplying the mixture to the emulsifying apparatus and that the shear force acting on the mixture is dependent on the speed of the vibration movement of vibrator element. As a result, it is possible for the amount of emulsification and the shear force to be independently changed, and therefore, it becomes possible to easily control the shear force acting on a predetermined amount of the mixture and becomes possible to set any average particle size for the halogenated magnesium adduct.

The emulsification of the mixture is performed at a temperature enabling the halogenated magnesium adduct to maintain its fluidity. The halogenated magnesium adduct becomes spherical particles of a uniform particle size and disperses in the dispersion medium. It is also possible to further emulsify by the emulsifying apparatus a mixture that has been preliminarily emulsified by another method of emulsification or this emulsifying apparatus.

The mixture which has been emulsified by passing through the emulsifying apparatus is quickly cooled or quenched to form a solid catalyst carrier for an olefin polymerization. As the means for quenching, any means may be adopted so long as the adduct particles do not join or deform or the desired spherical particles are not substantially lost. The preferred mode is to quickly cause contact of an organic solvent cooled to a temperature low enough to cause solidification of the adduct particles with the mixture. For example, the mixture is introduced into a cooled organic solvent preferably under agitation. Conversely, it is possible to introduce a cooled organic solvent into the mixture. The cooled organic solvent may be selected from those mentioned earlier as dispersion media. Further, it is possible to add the above-mentioned dispersion stabilizers to the cooled organic solvent. In this mode, it is desirable to maintain the temperature of the cooled organic solvent to a temperature lower than the temperature of fluidization of the adduct. Alternatively, it is possible to quench the mixture by blowing a cooling gas such as liquefied gas (e.g., liquefied nitrogen) into the mixture.

After quenching, the catalyst carrier for an olefin polymerization is obtained as a solid. The carrier is separated from the dispersion medium and the cooled organic solvent by filtration. The remaining medium and solvent are distilled off to give a powder. The catalyst carrier for an olefin polymerization is effective for the production of a catalyst for an olefin polymerization. It is also possible to use the carrier for the production of a catalyst for an olefin polymerization without separating from the hydrocarbons etc.

The resultant catalyst carrier for an olefin polymerization may control contents of compound capable of dissolving the magnesium halide. The method of control contents is not particularly limited. After removing the hydrocarbons etc., the compound capable of dissolving the magnesium halide can be removed by passing an inert gas heated to a temperature of from 20° to 130° C. Examples of the inert gas are nitrogen or argon. If necessary, these inert gases may be mixed with water vapor, oxygen, air, etc.

When producing a catalyst carrier for an olefin polymerization by the above method, spherical particles are obtained. It is possible to set the average particle size of the carrier anywhere in the range of 1 to 200 μm. Further, no matter what the average particle size, the geometric standard deviation σ of the particle size becomes 1.45 or less. When the catalyst carrier for an olefin polymerization is used for the production of a catalyst for an olefin polymerization, it becomes possible to give a superior flowability and a high bulk density to the catalyst and to the olefin polymer produced and it is sometimes possible to eliminate the granulation process.

EXAMPLES

The present invention will now be further explained in more detail by, but is by no means limited to, the Examples. The average particle size of the carrier and the geometric standard deviation of the particle size were determined in hexane by a laser diffraction particle size distribution measurement apparatus (made by Nihon Denshi).

Example 1

Figure 2:
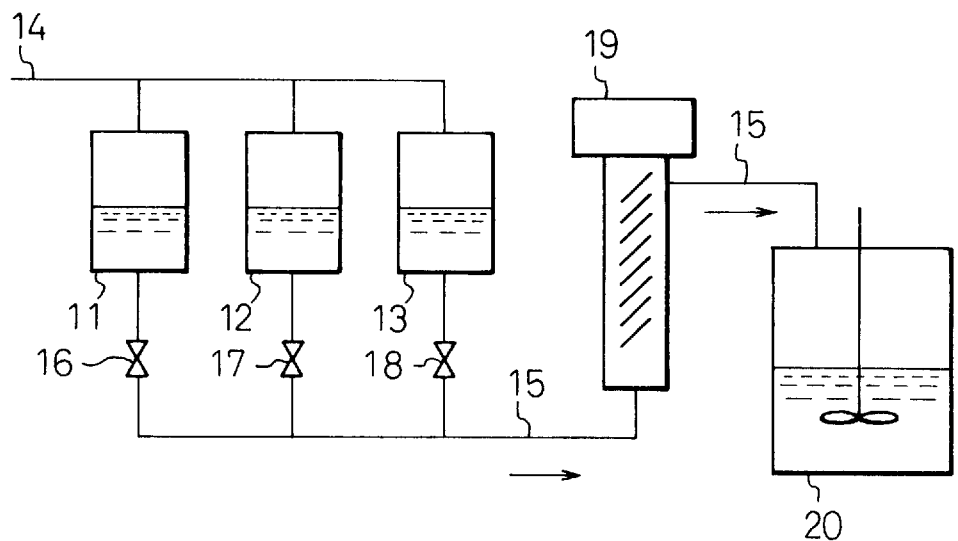
FIG. 2 is an explanatory view of the production process according to the present invention.

The carrier was prepared by the flow in accordance with the flow sheet of FIG. 2. The gas inside of an autoclave 11 around which was wound a heater, having an inside volume of 0.5 liter, and equipped with an agitator was fully replaced by $N_2$, then 34 g of anhydrous $MgCl_2$ and 60 g of ethanol were placed inside, the temperature of the system was raised under agitation, and the system was agitated at 120° C. for 3 hours. The gases inside of the autoclaves 12 and 13 around which were wound heaters and having inside volumes of 0.5 liter were fully replaced by $N_2$, then 150 ml of the dispersion medium Daphneeoil CP-68N (tradename, made by Idemitsu Kosan) and 150 ml of a dispersion stabilizer KF-96 1000 cs (tradename, made by Shin-Etsu Silicone) were placed in each of the above autoclaves, the temperatures of the systems were raised under agitation to 120° C., and the systems were then held at 120° C. An ethanol adduct of $MgCl_2$ and the above dispersion medium and dispersion stabilizer were transported to the liquid transport pipe 15 by pressurized nitrogen 14. The speeds of liquid transport were controlled by the flow control valves 16, 17, and 18. The emulsifying apparatus 19 used was a VIBRO LABO (made by Reika Kogyo Co.) having a spiral agitator as shown in FIG. 1. The adduct was made to disperse in the dispersion medium using this. The ethanol adduct of the $MgCl_2$, the liquid transport speed of the dispersion medium, the time of liquid transport, and the speed of agitation of the agitator device were as shown in Table 1. The emulsion in which the adduct was dispersed was successively introduced into a 2-liter glass flask (equipped with agitator) 20 filled with 500 ml of hexane cooled to −10° C. After the end of the liquid transport, the adduct was precipitated. The supernatent was removed by decantation and 200 ml of hexane was added. This procedure was repeated 4 times at −10° C. to wash the solid component. 40 g of a solid of the composition of $MgCl_2·3.0EtOH$ was obtained as a result. The solid was found to be composed of perfect spheres under observation by a microscope. The average particle size and the distribution of particle size (geometric standard deviation) of the $MgCl_2·3.0EtOH$ particles were as shown in Table 1.

Examples 2 and 3

The same procedure was followed as in Example 1 in the preparation of the carrier except that the speed of liquid transport of the ethanol adduct of $MgCl_2$, the speed of liquid transport of the dispersion medium to the liquid transport pipe, and the speed of agitation of the agitator device of the emulsifying machine were changed. The average particle size and the distribution of particle size (geometric standard deviation) of the $MgCl_2·3EtOH$ particles were as shown in Table 1. It was found that the average particle size of the carrier particles could be controlled by changing the liquid transport speed and the speed of agitation of the agitator device. Further, carrier particles were obtained with a geometric standard deviation of the particle size smaller than 1.45 and a narrow distribution of particle size no matter what the average particle size.

Comparative Example 1

Figure 3:
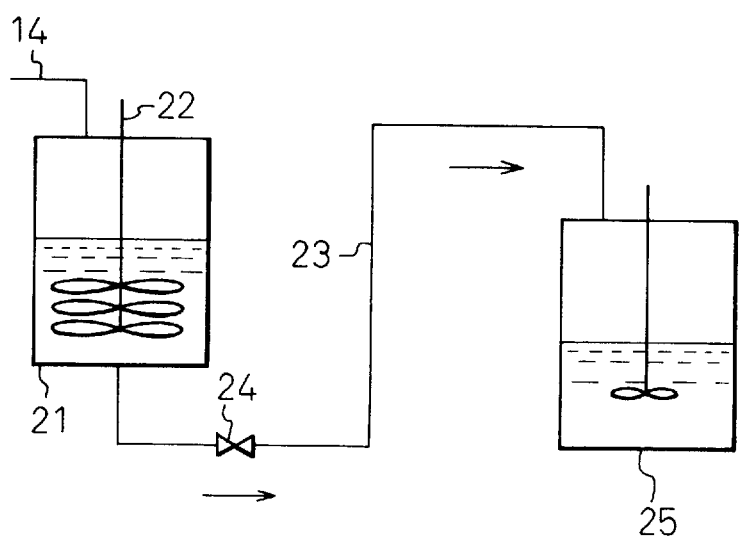
FIG. 3 is an explanatory view of the production process of the prior art.

The carrier was prepared in accordance with the flow sheet of FIG. 3. The gas inside of a glass container 21 (equipped cooling tube) of an inside volume of 1 liter and around which a heater was wrapped was fully replaced by $N_2$, then 17 g of anhydrous $MgCl_2$, 30 g of ethanol, 150 ml of the dispersion medium Daphneeoil CP-68N (tradename, made by Idemitsu Kosan), and 150 ml of a dispersion stabilizer KF-96 1000 cs (tradename, made by Shin-Etsu Silicone) were placed inside, the temperature of the system was raised, and the system was held at 120° C. for 3 hours. An ethanol adduct of $MgCl_2$ and the above dispersion medium were agitated for 10 minutes by a homomixer (made by Tokushu Kika Co.) 22 to cause the adduct to be dispersed in the dispersion medium. The emulsion in which the adduct was dispersed was transported to the liquid transport pipe 23 by pressurized nitrogen 14. The speed of liquid transport of the emulsion was controlled by the flow control valve 24. The speed of agitation of the homomixer and the speed of liquid transport and the transport time of the emulsion in which the adduct was dispersed were as shown in Table 2. The emulsion was successively introduced into a 2-liter glass flask (equipped with agitator) 25 filled with 500 ml of hexane cooled to −10° C. 200 ml of hexane was added and the supernatent was removed by decantation. This procedure was repeated 4 times at −10° C. to wash the solid component. Accordingly, 40 g of a solid of the composition of $MgCl_2·3.0EtOH$ was obtained as a result. The solid was found to be composed of perfect spheres under observation by a microscope. The average particle size and the distribution of particle size (i.e., geometric standard deviation) of the $MgCl_2·3.0EtOH$ particles were as shown in Table 2. It was not possible to obtain carrier particles of a narrow distribution of particle size such as shown in the examples.

Comparative Examples 2 to 3

The same procedure was repeated as in Comparative Example 1 in the synthesis of spherical $MgCl_2·nEtOH$, except that the speed of agitation of the homomixer was changed. The average particle size and the distribution of particle size (i.e., geometric standard deviation) of the $MgCl_2·3EtOH$ particles were as shown in Table 2. It was not possible to obtain carrier particles having a narrow distribution of particle size as shown in the Examples.

TABLE 1

Preparation Conditions and Results of Spherical MgCl$_2$.3EtOH

| | Liquid transport speed of components (ml/min) | | | Vibrating conditions | | MgCl$_2$.3EtOH particles | |
|---|---|---|---|---|---|---|---|
| | MgCl$_2$—EtOH melt | CP68-N | KF-96 | of vibrator element (number/min) | Emulsification efficiency α (×10$^{-4}$/times) | Average particle size (μm) | Geometric standard deviation |
| Ex. 1 | 4 | 4 | 4 | 1,500 | 6 | 25 | 1.43 |
| Ex. 2 | 4 | 4 | 4 | 750 | 12 | 50 | 1.39 |
| Ex. 3 | 8 | 8 | 8 | 750 | 25 | 97 | 1.42 |

TABLE 2

Preparation Conditions and Results of Spherical MgCl$_2$.3EtOH

| | Agitation | MgCl$_2$.3EtOH particles | |
|---|---|---|---|
| | speed of homomixer (rpm) | Average particle size (μm) | Geometric standard deviation |
| Comp. Ex. 1 | 6,000 | 30 | 2.71 |
| Comp. Ex. 2 | 3,000 | 55 | 2.51 |
| Comp. Ex. 3 | 1,500 | 88 | 2.39 |

According to the production process of the present invention, it is possible to produce a catalyst carrier for an olefin polymerization which has any average particular size in the range of 1 to 200 μm and has a narrow distribution of particle size. When polymerizing an olefin using a transition metal compound catalyst component produced from these carrier particles according to the present invention, polymer particles having any average particle size and a narrow distribution of particle size were produced.

We claim:

1. A process for producing a catalyst carrier for olefin polymerization comprising:

(i) flowing a mixture to be emulsified containing (A) a halogenated magnesium adduct and (B) a dispersion medium through an emulsifying apparatus comprised of (1) a conduit for passage of the mixture to be emulsified, (2) a vibrator element disposed in the conduit and vibrating in the axial direction of the conduit, and (3) a vibration device providing vibration movement to the vibrator element under conditions where the number N of the vibration movement per minute of the vibrator element is within the range of 100 to 10,000 movements per minute; and (ii) quenching the resultant mixture to form the catalyst carrier, said carrier having an average particle size of 1 to 200 μm and a geometric standard deviation of the particle size of not more than 1.45.

2. A process for producing said catalyst carrier for olefin polymerization as claimed in claim 1, wherein a halogenated magnesium adduct comprises magnesium chloride and an alcohol.

3. A process for producing a catalyst carrier for olefin polymerization as claimed in claim 1, wherein said flowing through the emulsifying apparatus occurs under conditions where the ratio Q/V between a volume Q of the mixture to be emulsified flowing through the emulsifying apparatus per minute and the inside volume V of the conduit of the emulsifying apparatus is within the range of 0.01 to 100 (liters per min/liters).

4. A process for producing a catalyst carrier for olefin polymerization as claimed in claim 1, wherein said flowing through the emulsifying apparatus occurs under conditions where the emulsification efficiency α, expressed by the following formula, is within the range of 0.0001 to 0.01 (/times):

$$\alpha = Q/(N \cdot V)$$

Q: Volume of mixture to be emulsified flowing through emulsifying apparatus per minute (liters per min)

N: Number (times per min) of vibration movement per minute of vibrator element in emulsifying apparatus V: Inside volume of conduit in emulsifying apparatus (liters).

* * * * *